United States Patent [19]

Grosjean

[11] 4,387,342

[45] Jun. 7, 1983

[54] PHASE-SHIFT KEYED DECODER

[75] Inventor: Jon P. Grosjean, South Woodstock, Conn.

[73] Assignee: Datavision, Inc., Roseville, Mich.

[21] Appl. No.: 240,531

[22] Filed: Mar. 4, 1981

[51] Int. Cl.³ .............................................. H04L 27/22
[52] U.S. Cl. .................................... 329/50; 329/122; 331/14; 375/83; 375/120
[58] Field of Search .................... 329/50, 122, 124; 331/14, 17; 375/83–87, 120

[56] References Cited

U.S. PATENT DOCUMENTS

| | | | |
|---|---|---|---|
| 3,181,122 | 4/1965 | Brown | 375/83 |
| 3,525,945 | 8/1970 | Puente | 329/122 X |
| 3,859,631 | 1/1975 | Holmes et al. | 375/87 |
| 4,000,476 | 12/1976 | Walker et al. | 329/122 X |
| 4,310,804 | 1/1982 | Ryon | 331/14 X |

*Primary Examiner*—Siegfried H. Grimm
*Attorney, Agent, or Firm*—Cullen, Sloman, Cantor, Grauer, Scott & Rutherford

[57] ABSTRACT

A system for decoding a PSK signal comprising a constant amplitude carrier whose phase shifts 180° each time a logical signal is transmitted. The decoder system includes a phase-locked loop including a first phase detector, a loop filter, and a voltage-controlled oscillator. The incoming PSK signal is supplied to the input of the phase-locked loop and through a 90° phase shifter to one input of a second phase detector. The other input of the second phase detector is taken from the output of the voltage-controlled oscillator and the output of the second phase detector will indicate whether a carrier or data is detected. The output of the second phase detector is connected to the inputs of first and second comparators. One comparator has its inputs biased so that it normally outputs a low signal until the second phase detector indicates the detection of a carrier. This output can be used as a source of reconstructed data. The second comparator responds to the detection of data by outputting a gating signal. A switching element located in the phase-locked loop is normally conductive to allow the loop to operate but the switching element is responsive to the gating signal from the output of the second comparator indicating that data is present to switch off the loop so as to enable the present decoder to be used with even relatively long data pulses even though the time constant of the loop filter is relatively fast for a quick lock-up time.

11 Claims, 3 Drawing Figures

PHASE-SHIFT KEYED DECODER

BACKGROUND OF THE INVENTION

This invention relates to a PSK communications system and more particularly to a PSK decoder having a fast lock-up time while simultaneously being able to handle even relatively long duration data pulses.

Phase-locked loops have been used in the past to decode PSK signals but the problem with PSK signals is that the loop must determine which of the two phases is the desired one since it will lock on to the 180° signal as well as the 0° signal.

One way to distinguish between the two signals and avoid the problem was to use a loop filter with a relatively long time constant and first transmit a 0° carrier for the loop to lock on to. This, however, forces the lock up time of the loop to be relatively long and simultaneously limits the data to be less than a square wave.

The present invention solves this problem by gating off the phase-locked loop whenever logical zeros are transmitted. By gating off the phase-locked loop, a relatively fast time constant can be chosen for the loop filter to ensure a relatively fast lock up time for the loop while enabling the system to be used to handle even relatively long data pulses.

More particularly, two comparators are used at the output of the present decoder. A first comparator is biased so that its output can be used to detect the presence of a carrier and the presence of data. This output can be used as a source of reconstructed data. The other comparator is biased so that its output can be used to gate off the loop only when data is present. This allows the loop filter to have a relatively fast time constant for fast lock up time and still be able to handle relatively long data pulses.

BRIEF SUMMARY OF THE INVENTION

The present invention comprises a system for recovering data from a PSK signal comprising a constant amplitude carrier whose phase is shifted 180° each time a logical zero is transmitted. The system includes a phase-locked loop comprising a first phase detector, a loop filter and a voltage-controlled oscillator. The system further includes a second phase detector and a phase shifter. The incoming PSK signals are supplied to the input of the phase-locked loop and through the phase shifter are supplied to one input of the second phase detector. The output of the voltage-controlled oscillator is supplied to the second input of the second phase detector so that the second phase detector can generate a first output state in response to the detection of a carrier and a second output state in response to the detection of data.

A first comparator is biased so that its output represents a first logical state, but changes to a second logical state in response to the detection of a carrier. This output can be used as a source of reconstructed data for further processing. A second comparator has its input connected to the output of the second phase detector and the second comparator is biased so that its output is normally in a second logical state but which switches to a first logical state in response to the detection of data. The output of the second comparator is supplied to the gate electrode of a switching element operatively coupled in the phase-locked loop so that the phase-locked loop is normally operative but switches to a nonconductive state to disable the phase-locked loop in response to the detection of data thereby enabling the system of the present invention to be able to handle even relatively long duration data signals even though the time constant of the loop filter is relatively fast to ensure a fast lock-up time for the loop.

Further, the system may include a low pass filter operatively coupled between the outputs of the second phase detector and the inputs of the comparators and the switching element may be, for example, a FET transistor. A phase shifter is used to shift an incoming signal by 90° and may be coupled between the source of PSK signals and the first inputs of the second phase detector or between the output of the voltage-controlled oscillator and the second inputs of the second phase detector.

BRIEF DESCRIPTION OF THE DRAWINGS

Other advantages and meritorious features of the present invention will be more fully understood from the following detailed description of the drawings and the preferred embodiment, the appended claims and the drawings, in which:

DETAILED DESCRIPTION OF THE PREFERRED EMBODIMENT

Figure 1:
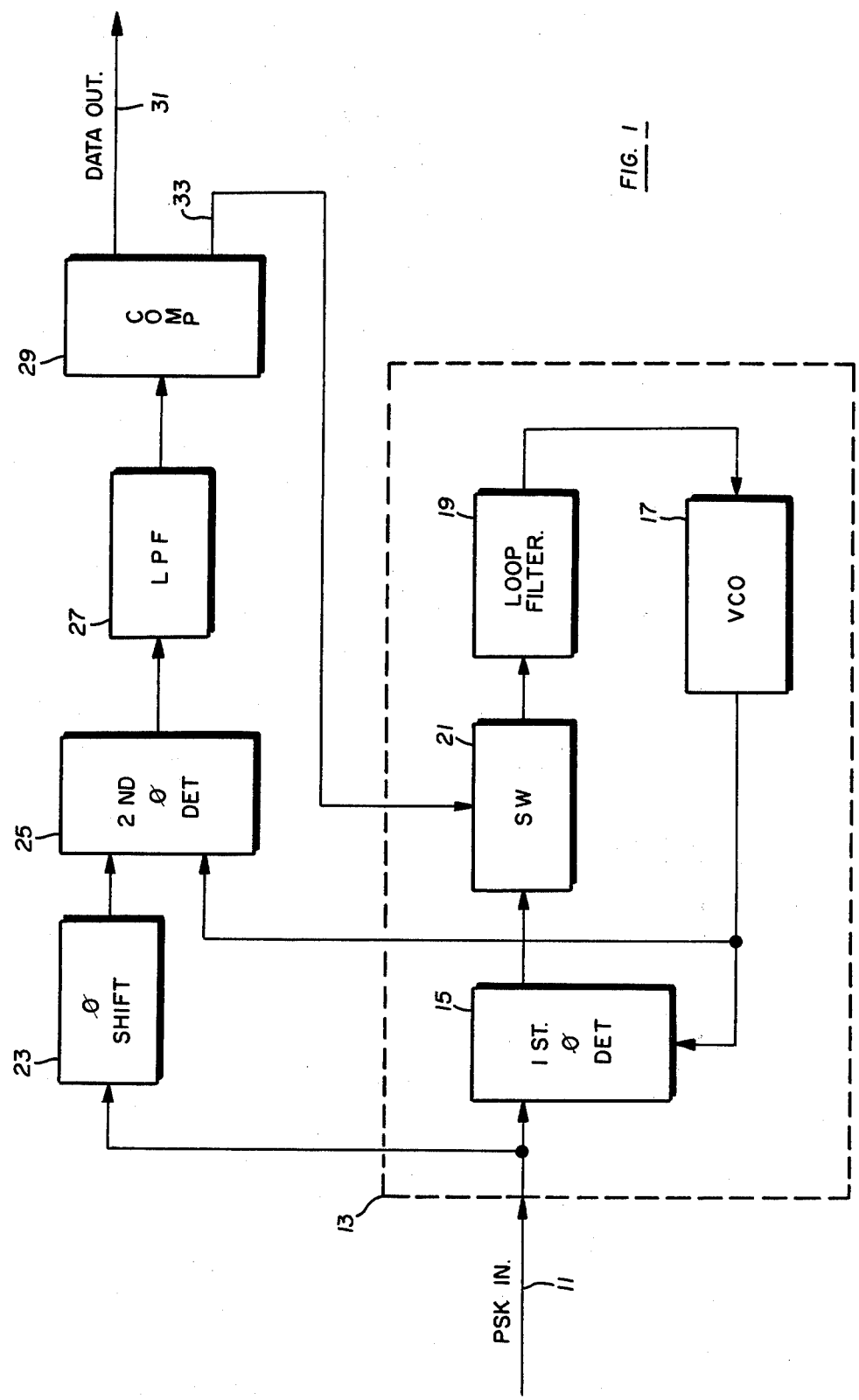
FIG. 1 is a block diagram of the PSK decoder of the present invention.

The preferred embodiment of the present inventon, as illustrated in the block diagram of FIG. 1, shows a decoder for receiving transmitted PSK signals and reconstructing the data for subsequent use. The phase-shift keyed (PSK) signals are received at the input of the decoder of the present invention as illustrated by the input lead 11. The incoming PSK signals are supplied via lead 11 to the phase-locked loop 13. The phase-locked loop 13 includes a first phase detector 15, a voltage-controlled oscillator 17, and a loop filter 19. These elements are connected together to form a conventional phase-locked loop.

A switching means 21 is inserted into the phase-locked loop. The switching means 21 is normally conductive to permit operation of the phase-locked loop as conventionally known. However, whenever data is detected, the switching means 21 is gated off thereby disabling the loop when data is present.

The incoming PSK signals are also supplied to a phase shifter 23 which shifts the phase of the incoming signal by 90° prior to passing the signal to one set of inputs of a second phase detector 25. The second set of inputs of the second phase detector 25 are connected to the output of the voltage-controlled oscillator 17 and the output of the second phase detector 25 will indicate the detection of a carrier or the detection of data.

The output of the second phase detector 25 is coupled through a low pass filter 27 to the input of comparator means 29. The comparator means 29 includes a first comparator which has its inputs biased so that the output on lead 31 is normally low but goes high in response to the detection of a carrier. Since we have either a carrier or data present at all times, the output of the first comparator on lead 31 represents a reconstruction of the original data and can be used as such.

The second comparator of the comparator means 29 is responsive to the detection of data by the second phase detector 25 and the output 33, which is normally biased high to enable the switching means 21 to conduct, will go low in response to the detection of data to gate off the switch 21 to disable the phase-locked loop 13 thereby enabling the detector/decoder system of FIG. 1 to handle even relatively long duration data pulses which simultaneously ensures a fast loop lock-up time since a fast RC time constant is used for the loop filter 19.

Figure 2:
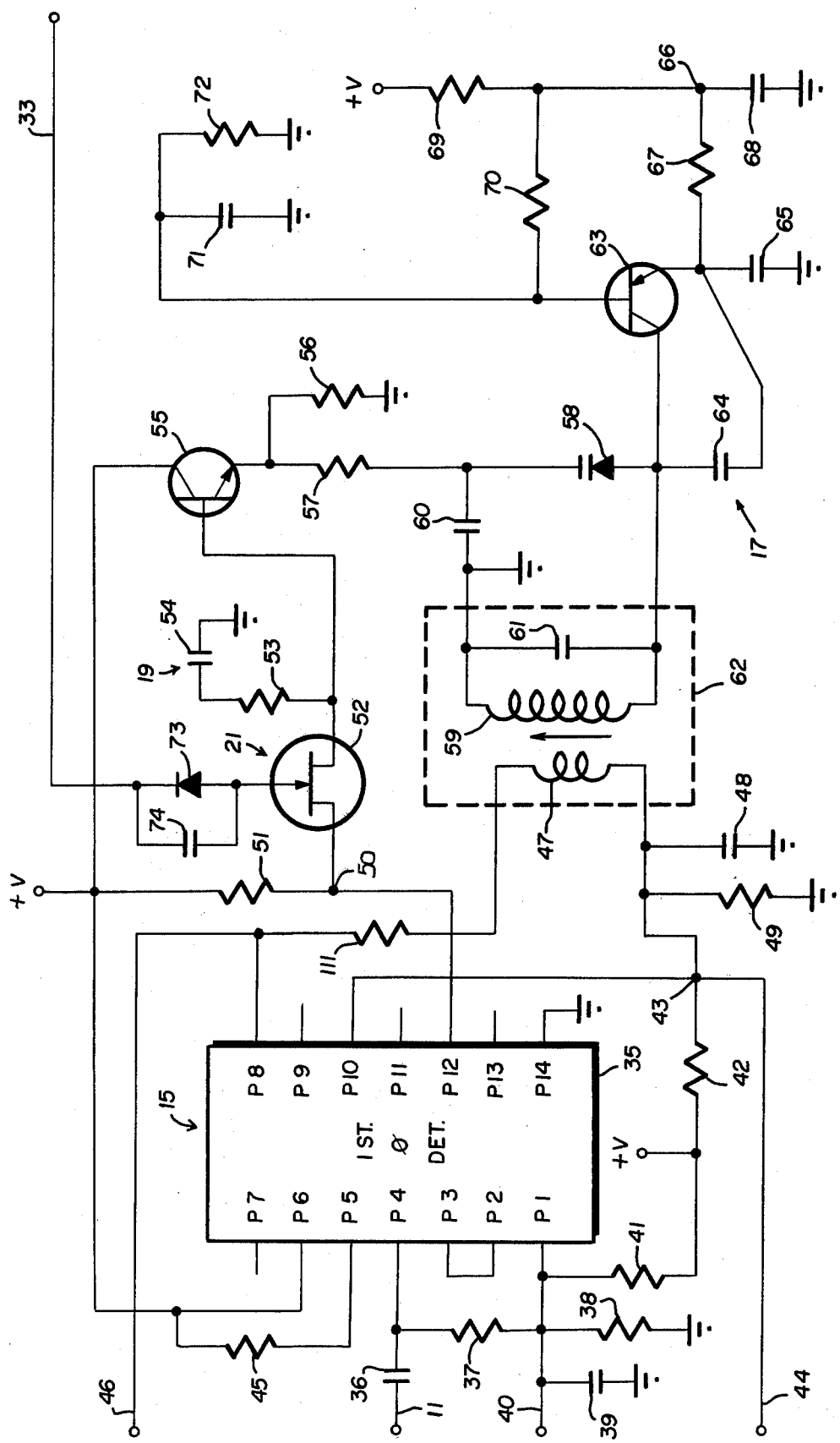
FIG. 2 is an electrical circuit diagram illustrating the circuitry associated with the phase-locked loop of the present invention.

The electrical circuit diagram of FIG. 2 illustrates the circuitry used in the preferred embodiment of the present invention to implement the phase-locked loop 13 of FIG. 1. The first phase detector 15, voltage-controlled oscillator 17, loop filter 19, and switch 21 will be described in detail. The first phase detector 15 may be, for an example, an MC 1496 Balanced Modulator-Demodulator such as that manufactured by Motorola Corporation. In the preferred embodiment of the present invention, the balanced modulator-demodulator 35 is used as a phase detector, and is hereinafter referred to as the first phase detector 35. The first phase detector 35 has a first pair of inputs P1, P4 and a second pair of inputs P8, P10. The outputs of the phase detector 35 are P6, P12.

The incoming PSK signals to be decoded are received via lead 11 which is connected to one plate of a capacitor 36. The opposite plate of capacitor 36 is connected directly to input P4 of the first phase detector 35. The input P4 is also connected to the input P1 through a resistor 37. Inputs P2 and P3 are connected directly together, pin 14 is grounded, and pins 7, 9, 11 and 13 are open. The input P1 is connected through a resistor 38 to ground and through a capacitor 39 to ground. P1 is also connected to the input of the phase shift circuitry of block 23 via lead 40 as hereinafter described.

P1 is also connected through a resistor 41 to a plus 12 volt source of potential. The 12 volt source of potential is also connected through a resistor 42, to node 43. Node 43 is connected directly to the P10 input and via lead 44, is connected to an input of the second phase detector of block 25 as hereinafter described.

The P6 output is connected directly to a plus 12 volt source of potential and the source of potential is connected to P5 through a resistor 45. The P8 input is connected to an input of the second phase detector of block 25 via lead 46 and to one end of a transformer coil 47 through a resistor 111. The opposite end of the transformer coil 47 is connected to ground through a capacitor 48, to ground through a resistor 49, and to node 43 as previously described.

The output of the first phase detector 35 is taken from P6 and P12. P6 is connected to the plus 12 volt source of potential as previously described while P12 is connected directly to node 50. Node 50 is connected through a resistor 51 to the plus 12 volt source of potential and to one current-carrying electrode of an FET transistor 52 which, in the preferred embodiment of the present invention, constitutes the switching means of block 21 of FIG. 1.

The second current-carrying electrode of the FET transistor 52 is connected to the loop filter 19 comprising resistor 51, resistor 53 and capacitor 54. The second current-carrying electrode of the FET transistor 52 is connected to one terminal of a resistor 53 whose opposite terminal is connected to one plate of a filter capacitor 54. The opposite plate of capacitor 54 is grounded and, in the preferred embodiment of the present invention, the values of resistor 51, resistor 53 and capacitor 54 are chosen so that the loop filter 19 has a relatively fast RC time constant to ensure a rapid lock-up time for the phase-locked loop 13.

The second current-carrying electrode of FET transistor 52 is also connected to the base of a NPN transistor 55. The collector of transistor 55 is connected directly to the plus 12 volt source of potential while the emitter is connected through a resistor 56 to ground. The emitter of transistor 55 is also connected through a resistor 57 to the cathode of a varactor diode 58. The varactor diode 58 serves as a tuning diode for the voltage-controlled oscillator 17.

The anode of the varactor diode 58 is connected to one terminal of a transformer coil 59 whose opposite terminal of the coil 59 is connected to ground and through a capacitor 60 is connected back to the cathode of varactor 58. The opposite terminals of the oscillator coil 59 are also connected together through an oscillator capacitor 61. The combination of the capacitor 61, coil 59 and coil 47 constitutes the oscillator tank circuit referred to generally by reference numeral 62.

The oscillator circuitry of the voltage-controlled oscillator of block 17 of FIG. 1 also includes a transistor circuit as hereinafter described. A PNP transistor 63 has its collector connected directly to the anode of the varactor diode 58 while the emitter of the transistor 63 is connected (1) back to the anode of the varactor diode 58 through a capacitor 64; (2) to ground through a capacitor 65; (3) and to a node 66 through a resistor 67. Node 66 is connected to ground through a capacitor 68 and is connected to a plus 12 volt source of potential through a resistor 69. Node 66 is further connected through a resistor 70 back to the base of the transistor 63. The base of transistor 63 is further coupled to ground through a capacitor 71 and a resistor 72.

Lastly, the switching signals used to control the operation of the FET transistor 52 are received from the output of the second comparator of the comparator means 29 of FIG. 1 via lead 33. Lead 33 is connected to the cathode of a diode 73 whose anode is connected directly to the gate electrode of the FET transistor 52 and a capacitor 74 is connected in parallel with the diode 73.

The operation of the circuitry in FIG. 2 will now be briefly described. The first phase detector 15, loop filter 19, and voltage-controlled oscillator 17, are configured to form a phase-locked loop. The first phase detector 35 has one pair of inputs P1, P4 operatively coupled to receive incoming PSK signals to be decoded. A second set of inputs P8, P10 of the first phase detector 35 are coupled to receive signals from the output of the voltage-controlled oscillator 17. The voltage-controlled oscillator includes a 4.5 MHz oscillator whose output is taken from the oscillator tank circuit 62 and supplied to the second set of input P8, P10 of the first phase detector 35. In the present case, the center frequency of the oscillator is selected by the values of the oscillator coil 59, capacitor 61 and the varactor diode 58 but, it should be understood that a crystal or ceramic resonator or the like could also be used to set the center frequency.

The incoming PSK signals present at the P1, P4 inputs and the voltage-controlled oscillator outputs supplied to inputs P8, P10, cause the double balanced mixer 35 to function as a phase detector. The output of the first phase detector 35 is taken from P6, P12 and P12 is connected to one current-carrying electrode of the FET transistor 52. The FET transistor 52 is normally conductive due to the presence of a high signal on lead 33 as hereinafter described. The output from pin 12 is, therefore, supplied through a conducting FET transistor 52 to the loop filter comprising primarily resistor 53 and capacitor 54. The values of resistor 51, resistor 53 and capacitor 54 are, in the preferred embodiment of the present invention, selected so as to have a relatively first RC time constant to enable the phase-locked loop to have a rapid lock-up time.

Transistor 55 is used as an emitter follower and the signal at the base of transistor 55 at the output of the loop filter controls the current flowing through transistor 55 to the tuning diode 58. This results in the voltage-controlled oscillator locking up 90° out of phase with the input carrier. In order to detect the carrier, it is therefore necessary to shift either the carrier or the voltage-controlled oscillator signal 90° and then apply these signals to the second phase detector 25 of FIG. 1. In the embodiment disclosed herein, the input signal is shifted 90° through the action of the phase shifter 23, as hereinafter described, and the result is supplied to the second phase detector 25.

The phase-locked loop shown in FIG. 2 is fairly conventional in both its construction and operation. However, if the time constant of the loop filter comprising resistors 51, 53 and capacitor 54 is relatively fast, the circuit would have great difficulty in handling relatively long duration data pulses due to the very nature of the operation of the phase-locked loop. However, the insertion of the switching element 21 and the use of two comparator outputs permits the loop to be gated off whenever data is detected thereby allowing the system to operate on even relatively long duration data pulses while simultaneously permitting the use of a loop filter 19 having a relatively fast time constant.

The operation of the phase shifter 23, second phase detector 25, loop low pass filter 27 and comparator means 29 of FIG. 1 will now be briefly described with reference to FIG. 3. The incoming PSK signals are received on lead 11 and supplied through a capacitor 75 to the input of the phase shift circuit of block 23. The input lead 40 from P1 of the first phase detector 35 is connected to the P1 input of the second phase detector 76. The second phase detector 76 is, in the preferred embodiment of the present invention, a Double Balanced Mixer MC1496 such as that used for the first phase detector 35.

The phase shift circuitry of block 23 includes a coil 77 having one terminal connected to the incoming lead 11 at the P4 input of the second phase detector 76 and its opposite terminal connected to the P1 input at lead 40. In parallel with the coil 77 between the P1, P4 inputs of the second phase detector is a capacitor 78, and the parallel combination of the coil 77, capacitor 78, and capacitor 75 operates as a phase shifter so that the input signals received via leads 11 and 40 are shifted 90° before being supplied to inputs P4, P1 of the second phase detector 76. P4 is further connected to P1 through a resistor 79 and P2 is connected to P3 through a resistor 80. P5 is connected to a plus 12 volt source of potential through a resistor 81; P14 is grounded; and P7, P9, P11 and P13 are open.

The second set of inputs P8, P10 of the second phase detector 76 are connected via leads 44, 46 to the corresponding inputs P8, P10 of the first phase detector 35 of FIG. 2. The outputs of the second phase detector 76 are taken from P6 and P12, and P6 is connected directly to a node 81 while P12 is connected directly to a node 82. Node 81 is connected through a capacitor 83 to ground while node 82 is connected through a capacitor 84 to ground. Node 81 is also connected to one terminal of an inductor 85 while node 82 is connected to one terminal of an inductor 86. The opposite terminal of the inductor 85 is connected through a capacitor 87 to ground while the opposite terminal of the inductor 86 is connected through a capacitor 88 to ground. The opposite terminal of inductor 85 is also connected to a plus 12 volt source of potential through a resistor 89 and the opposite terminal of the second inductor 86 is connected to the plus 12 volt source of potential through a resistor 90.

The comparator means 29 of the block diagram of FIG. 1 is, in the preferred embodiment of the present invention, a dual voltage comparator such as an RCA-CA3290E. As such, comparator means 29 can be treated as two comparators each having a pair of comparator inputs and a comparator output. The inputs to the first comparator are represented by P5, P6. The output of the first comparator is taken from P7. Similarly, the inputs of the second comparator are P2, P3 and the output is taken from P1.

The biasing associated with the comparator inputs will now be briefly described. The second terminal of inductor 85 is connected through node 92 and resistor 95 to the P6 negative input of the first comparator of comparator means 29. Node 92 is further connected through a resistor 96 to the negative input P2 of the second comparator of the comparator means 29. The P2 input is further connected to ground through a resistor 97 while the P6 input is connected to a plus 12 volt source of potential through a resistor 98.

Similarly, the positive inputs are connected as follows. The opposite terminal of inductor 86 is connected through a resistor 91 to the positive input P5 of the first comparator and through a resistor 94 to the positive input P3 of the second comparator of the comparator means 29. The plus source of potential is further connected (1) to the P8 input of the comparator means 29, (2) to the P3 input of the second comparator through a resistor 99, and (3) to the junction of a pair of resistors 100, 101. The opposite terminal of resistor 100 is connected directly to the first comparator output lead 31 which is taken from P7 and the opposite terminal of resistor 101 is connected to the output lead 33 from the output P1 of the second comparator.

Figure 3:
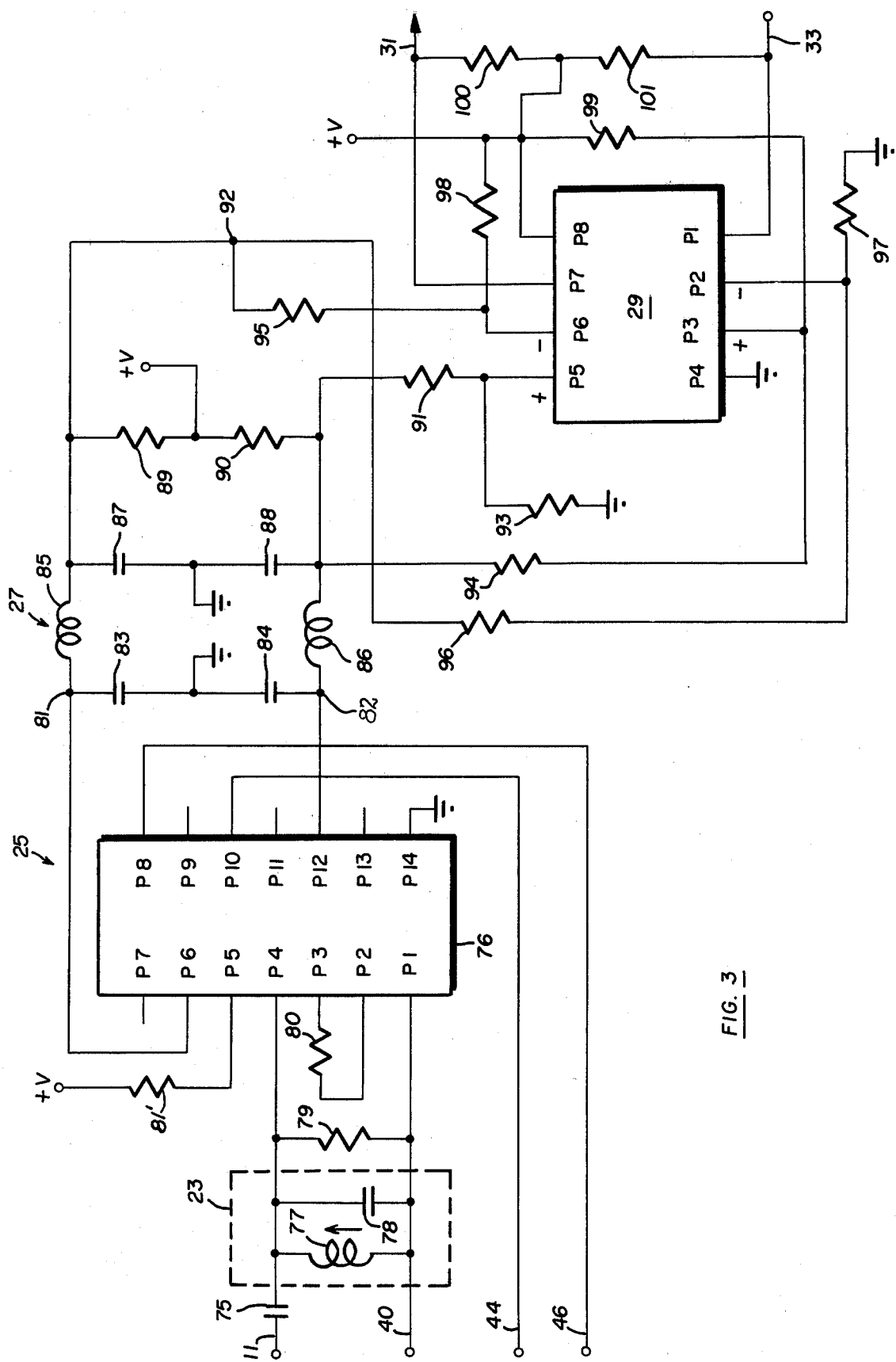
FIG. 3 is an electrical circuit diagram of the second phase detector, low pass filter, and comparators of the decoder circuit of FIG. 1.

The operation of the circuit of FIG. 3 will now be briefly described. Whenever the voltage-controlled oscillator of FIG. 2 locks up 90° out of phase with the input carrier, it is necessary to shift either the incoming PSK signals or the voltage-controlled oscillator output 90° and apply these signals to a second phase detector 76. In the preferred embodiment of the present invention, the incoming PSK signals arriving on lead 11 are shifted 90° to enable carrier phase detection. The actual shifting of the incoming signals is done by the phase shift circuit 23 comprising coil 77, capacitor 78 and capacitor 75.

The second phase detector 76 therefore receives the phase shifted PSK input signals at its inputs P1, P4 while the output of the voltage-controlled oscillator 17 are supplied to the second pair of inputs P8, P10. The second phase detector 76 receives the input PSK signals shifted 90° through the action of coil 77 and capacitor 78 and the signal outputted from the voltage-controlled oscillator and the second phase detector 76 outputs a signal at P6, P12. If a carrier is detected by the second phase detector 76 and locked onto, P12 goes more positive and P6 goes negative and this output state or condition is passed through a 50 KHz low pass filter comprising capacitors 83, 84, 87, 88 and inductors 85, 86. Similarly, whenever data is detected by the second phase detector 76, the opposite is true.

The problem with PSK signals is that the loop must determine which phase is the desired one since it will tend to lock on either the 180° signal or the 0° signal. The prior art teaches the use of a loop filter with a relatively long time constant and must first transmit the 0° carrier for the loop to lock on to. This, however makes the lock-up time of the loop relatively long and limits the shape and duration of data signals which can be detected and reconstructed.

With the present invention, the problem is solved by gating off the loop when logical zeros are transmitted. The dual voltage comparator 29 is used for two purposes. A first comparator is biased so as to be held normally low but which goes high whenever a carrier is detected by the second phase detector 76 thereby enabling the first comparator to output reconstructed data. The other comparator is biased normally high but which goes low to generate a gate signal which gates off the FET 52 of FIG. 2 to disable the phase-locked loop whenever data is detected. This enables the phase-locked loop 13 to utilize a loop filter with a relative fast time constant for fast lock up time while simultaneously enabling the decoder of the present invention to handle relatively long data pulses.

In the preferred embodiment of the present invention, the lock up time is less than one millisecond and the maximum data pulse width is greater than 250 microseconds. Unlike previous systems, once the carrier lock-on has been achieved, it is possible to transmit data pulses which last far longer than the periods of no data.

The operation of the dual comparator of block 29 will now be briefly described. Whenever a carrier is detected by the second phase detector 76, P12 will go more positive than P6. Similarly, data pulses causes the opposite effect. Therefore, if one comparator of the dual comparator 29 is biased such that P6 must go more positive than P12 to produce an output, it will produce an output only during data pulses.

Note that both comparator positive inputs are connected to the same output of the second phase detector 76 and both negative inputs are connected to the same outputs of the second phase detector 76. The value of the resistor 98 coupled between the plus 12 volt source of potential and the P6 input of the first comparator causes the P7 output of the first comparator on lead 31 to be held at a logical zero until a carrier is present.

Similarly, the value of the resistor 99 connected between the plus 12 volt source of potential and the positive input P3 of the second comparator causes the second output P1 on lead 33 to be held high at plus 12 volts unless a data pulse is detected. Therefore, when data pulses are present, the output from P1 is low and this is supplied via lead 33 to the gate electrode of the FET transistor 52 of FIG. 2 causing it to turn off and disable the phase-locked loop so long as data is present.

With this detailed description of the specific apparatus used to illustrate the preferred embodiment of the present invention and the operation thereof, it will be obvious to those skilled in the art that various modifications can be made in the present circuits recited herein without departing from the spirit and scope of the invention which is limited only by the appended claims.

What is claimed is:

1. In a PSK communications system wherein a constant amplitude carrier has its phase shifted 180° each time a logical zero is transmitted, a PSK receiver including a phase-locked loop having a first phase detector, a loop filter, and a voltage-controlled oscillator, the output of the voltage-controlled oscillator being operatively coupled to a first pair of inputs of said first phase detector and the transmitted PSK signals being operatively coupled to a second pair of inputs of said first phase detector such that the output of said first phase detector is zero whenever the signals present at its first and second pairs of inputs are 90° out of phase and the output of said first phase detector is a maximum whenever the signals present at its first and second pairs of inputs are in phase or 180° out of phase, the output of said first phase detector being operatively coupled to the input of said voltage-controlled oscillator through said loop filter, the improvement comprising:

said loop filter having a relatively fast time constant for a fast loop lock-up time;

switching means operatively coupled in said loop, said switching means being normally conductive for enabling said phase-locked loop to operate but said switching means being responsive to a gating signal indicative of the detection of data for turning off the phase-locked loop during a data pulse so as to enable the use of a relatively fast time constant loop filter while simultaneously enabling the system to be able to handle even relatively long duration data pulses;

a second phase detector having first and second pairs of inputs and a pair of outputs, said second phase detector outputting a first signal whenever a carrier is detected and a second signal whenever data is detected;

first coupling means for operatively coupling one of said pairs of inputs of said first phase detector to one of said pairs of inputs of said second phase detector;

second coupling means for operatively coupling the other pair of inputs of said first phase detector to the other pair of inputs of said second phase detector;

phase shifter means operatively coupled in one of said first or second coupling means for shifting the phase of an input signal 90°; and comparator means having inputs operatively coupled to the outputs of said second phase detector, said comparator means having a first output for supplying a first logic state signal whenever a carrier is detected and a second logical state signal whenever data is detected, said comparator means further including a second output for supplying said gating signal to said switching means whenever data is detected.

2. The improved PSK system of claim 1 where said comparator means includes first and second comparators, said first comparator having its inputs operatively coupled to the outputs of said second phase detector, means for biasing said first comparator so that its output is normally zero until a carrier is detected such that the output of said first comparator can be used to supply digital data pulses to a utilization device; and said second comparator having its inputs operatively coupled to the outputs of said second phase detector, means for biasing said second comparator so that its output is normally high until a data pulse is detected, the output of said second comparator being operatively coupled to said switching means for gating off the loop whenever data is detected.

3. The improved PSK system of claim 2 wherein said gating means includes a FET transistor connected in the phase-locked loop such that one current-carrying electrode of said FET transistor is operatively coupled to the output of said first phase detector and the second current-carrying electrode of said FET transistor is operatively coupled to the loop filter, the gate of said FET transistor being operatively coupled to the output of said second comparator so that the FET is normally conductive to enable the phase-locked loop to operate, said FET transistor being switched to a nonconductive state in response to a gating signal from said second comparator indicating that data has been detected.

4. The PSK system of claim 3 wherein the outputs of said second phase detector are operatively coupled to the inputs of a low pass filter and the outputs of the low pass filter are connected through resistive biasing means to the inputs of said first and second comparators.

5. A phase-shift keyed decoder comprising:
a first phase detector having first and second inputs and an output, said first input being operatively coupled to a source of PSK signals,
a voltage-controlled oscillator having an input and an oscillator output, said output being operatively coupled to the second input of said first phase detector,
a loop filter, said first phase detector, said loop filter and said voltage-controlled oscillator being operably coupled to form a phase-locked loop, said loop filter having a relatively fast time constant for enabling the phase-locked loop to have a fast lock-up time,
switching means operatively coupled in said phase-locked loop and being normally conductive to allow said loop to operate, said switching means being responsive to a switching signal indicative of the presence of a data pulse to turn off the loop so as to enable the system to operate on even relatively long data pulses;
a second phase detector means and a phase shift means, said phase detector means including first and second inputs and an output, of said source of PSK signals and said voltage-controlled oscillator output being operatively coupled to the first input of said second phase detector through said phase shift means for shifting the phase of incoming signals by ninety degrees and the other of said source of PSK signals and said voltage-controlled oscillator output being operatively coupled to the second input of said second phase detector, the output of said second phase detector being in a first state whenever a carrier is detected and a second state whenever data is detected;
comparator means operatively coupled to the outputs of said second phase detector and having first and second outputs, said first comparator output being responsive to said first state for generating data signals indicative of the detection of both carrier and data pulses and said second comparator output being responsive to said second state for generating said switching signal whenever data is detected for turning off the phase-locked loop so as to allow the system to operate with a fast loop lock-up time while simultaneously enabling the system to handle even relatively long data signals.

6. A phase-shift keyed signal decoder comprising:
a phase-locked loop including a first phase detector, a loop filter, and a voltage controlled oscillator operatively coupled to a loop such that whenever the signals present at the input of the first phase detector are 90° out of phase with one another, the output is zero and whenever the signals present at the inputs of the first phase detector are in phase or 180° out of phase, the output is maximum,
means for coupling a source of PSK signals to one input of said first phase detector,
a phase shifting means for shifting the phase of incoming signals by 90°,
means for operatively coupling said source of PSK signals to said phase shift means,
a second phase detector having first and second inputs and an output,
means for operatively coupling the output of said phase shift means to the first input of said second phase detector,
means for operatively coupling the output of the voltage-controlled oscillator to the second input of said second phase detector,
first and second comparator means each of which includes a pair of inputs and a comparator output,
means for operatively coupling the output of said second phase detector to the inputs of said first and second comparators, the output of said second phase detector being in a first state in response to the detection of a carrier signal and a second state in response to the detection of a data signal,
means for biasing the inputs of said first comparator means so that the output is held normally in a first logic state, but goes to a second logical state in response to the detection of a carrier signal,
means for biasing the inputs of the second comparator so that the output of the second comparator is normally in a second logical state but goes to a first logical state in response to the detection of a data signal,
switching means having a gate electrode and being operatively coupled in said phase-locked loop,
means for operatively coupling the output of said second comparator to the gate of said switching means so that said switching means is normally conductive to enable the phase-locked loop to operate, said switching means being responsive to the presence of said first logical state indicative of the detection of a data signal for switching to a nonconductive condition thereby disabling the loop and enabling the system to handle data signals of even a relatively long duration.

7. In a system for recovering data from a PSK signal comprising a constant amplitude carrier whose phase is shifted 180° each time a logical zero is transmitted, the improvement comprising:
a phase-locked loop comprising a first phase detector, a loop filter and a voltage-controlled oscillator,
a second phase detector having first and second inputs and an output,
means for operatively coupling a source of PSK signals and the output of said voltage-controlled oscillator to the first and second inputs of said second phase detector, said coupling means including means for shifting the phase of one of said voltage-controlled oscillator output and said source of PSK signals by 90°, said second phase detector outputting a first signal in reponse to the detection of a carrier and a second signal in response to the detection of data, comparator means having its inputs operatively coupled to the output of said second phase detector, said comparator means being biased for normally outputting a first logical state signal and being responsive to said first signal at the output of said second phase detector indicative of the detection of a carrier for outputting a second logical state signal, thereby enabling data to be reconstructed from the original incoming PSK signals, and means for gating the phase-locked loop off whenever data is detected, thereby permitting operation even with relatively long data pulses.

8. The data reconstruction system of claim 7 wherein said gating means includes means responsive to said second signal at the output of said second phase detector indicative of the detection of data for generating a gating signal, and switching means operatively disposed in said phase-locked loop and responsive to said gating signal for switching off the loop whenever data is detected.

9. The data reconstruction system of claim 8 wherein said means for generating said gating signal includes a second comparator having inputs operatively connected to the output of said second phase detector, means for biasing the input of said second comparator so that its output is normally in a second logical state, the output of said second comparator switching to a first logical state in response to said second signal at the output of said second phase detector, said first logical state signal serving as said gating signal to turn off the phase-locked loop in response to the detection of data.

10. The data reconstruction system of claim 7 wherein said phase-locked loop has a relatively fast time constant to ensure a fast lock up time for the phase-locked loop, said gating means turning off the phase-locked loop in response to the detection of data so that even relatively long data pulses can be handled in spite of the fast time constant of the loop filter.

11. A PSK decoder system for decoding PSK signals wherein a constant amplitude carrier has its phase shifted 180° each time a logical zero is transmitted, the PSK decoder comprising:

a first phase detector having first and second pairs of inputs and a pair of outputs, said first pair of inputs being operatively coupled to receive incoming PSK signals, a voltage-controlled oscillator having an input and an output, a loop filter having a relatively fast time constant, a gating element having its current-carrying electrodes operatively coupled between an output of said first phase detector and said loop filter, the output of the loop filter being operatively coupled to the input of said voltage-controlled oscillator and the output of the voltage-controlled oscillator being operatively coupled back to the second pair of inputs of said first phase detector to form a phase-locked loop.

said gating element having a gate electrode, and normally being maintained in a conductive state to allow the phase-locked loop to operate, said gating element being responsive to a gating signal at its gate electrode for switching to a nonconductive state so as to disable the phase-locked loop, a second phase detector having a first and a second pair of inputs and a pair of outputs, means for operatively coupling the output of the voltage controlled oscillator to one pair of inputs of said second phase detector, a phase shift means responsive to a signal at its input for outputting a signal shifted 90° in phase;

means for operatively coupling said incoming PSK signals to the input of said phase shifter, means for operatively coupling the output of said phase shifter to said second pair of inputs of said second phase detector, first and second comparator means each having a pair of inputs and a comparator output, means for operatively coupling the outputs of said second phase detector to the inputs of said first and second comparators, the outputs of said second phase detector being in a first state in response to the detection of a carrier signal and a second state in response to the detection of a data signal, means for biasing said first comparator so that its output is normally a logical zero, the output of said first comparator going high indicative of a logical one in response to the detection of a carrier signal thereby enabling said first comparator to output reconstructed data signals;

means for biasing said second comparator so that the output of the second comparator is normally held high but is responsive to the detection of a data signal for switching to a logical zero state, the logical zero state being operatively coupled back to the gate electrode of said gating element to function as said gating signal for turning off said gating element to disable the phase-locked loop in response to the detection of a data signal thereby enabling the decoder to handle even relatively long data signals even though the loop filter establishes a relatively fast loop lock-up time.

* * * * *